United States Patent
Yang et al.

(10) Patent No.: US 9,898,200 B2
(45) Date of Patent: Feb. 20, 2018

(54) MEMORY DEVICE HAVING A TRANSLATION LAYER WITH MULTIPLE ASSOCIATIVE SECTORS

(71) Applicant: SAMSUNG ELECTRONICS CO., LTD., Suwon-si, Gyeonggi-do (KR)

(72) Inventors: Zhengyu Yang, Boston, MA (US); Sina Hassani, Santa Cruz, CA (US); Manu Awasthi, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 82 days.

(21) Appl. No.: 15/093,682

(22) Filed: Apr. 7, 2016

(65) Prior Publication Data

US 2017/0242583 A1 Aug. 24, 2017

Related U.S. Application Data (60) Provisional application No. 62/297,011, filed on Feb. 18, 2016.

(51) Int. Cl.
G06F 12/00 (2006.01)
G06F 3/06 (2006.01)
G06F 12/02 (2006.01)

(52) U.S. Cl.
CPC ............ *G06F 3/061* (2013.01); *G06F 3/064* (2013.01); *G06F 3/0659* (2013.01); *G06F 3/0679* (2013.01); *G06F 12/0246* (2013.01); *G06F 2212/1016* (2013.01); *G06F 2212/214* (2013.01); *G06F 2212/7201* (2013.01)

(58) Field of Classification Search
CPC .. G06F 12/00; G06F 12/0238; G06F 12/0246; G06F 3/0679
USPC ........................................ 711/100, 103, 154
See application file for complete search history.

(56) References Cited

U.S. PATENT DOCUMENTS

| | | | |
|---|---|---|---|
| 7,433,993 B2 | 10/2008 | Sinclair | |
| 8,117,374 B2 | 2/2012 | Kim et al. | |
| 8,161,265 B2 | 4/2012 | Arimilli et al. | |
| 2007/0067573 A1* | 3/2007 | Bruening | G06F 9/3851 711/125 |
| 2012/0072798 A1 | 3/2012 | Unesaki et al. | |
| 2012/0317377 A1 | 12/2012 | Palay et al. | |
| 2013/0036289 A1 | 2/2013 | Welnicki et al. | |
| 2013/0159815 A1* | 6/2013 | Jung | G06F 11/10 714/773 |
| 2013/0173954 A1* | 7/2013 | Woo | G06F 11/167 714/6.13 |
| 2014/0006694 A1* | 1/2014 | Seo | G06F 12/0246 711/103 |

(Continued)

*Primary Examiner* — Tuan Thai
(74) *Attorney, Agent, or Firm* — Innovation Counsel LLP (57) ABSTRACT

A method for providing a memory translation layer includes: receiving write request streams from a host computer; selectively storing each write request stream into a sequential zone, a K-associative zone, and a random zone of log blocks of a nonvolatile memory based on the characteristics. A first group of the write request streams that are sequential and start from a header page of a log block are stored in the sequential zone. A second group of the write request streams that are sequential but do not start from a header page of a log block are stored in the K-associative zone. A third group of the write request streams that are random are stored in the random zone.

19 Claims, 4 Drawing Sheets

(56) References Cited

U.S. PATENT DOCUMENTS

| | | | |
|---|---|---|---|
| 2014/0101513 A1* | 4/2014 | Kim | G06F 11/1004 714/758 |
| 2015/0199138 A1* | 7/2015 | Ramachandran | G06F 12/122 711/103 |
| 2016/0011971 A1* | 1/2016 | Lee | G06F 12/0246 711/103 |

* cited by examiner

MEMORY DEVICE HAVING A TRANSLATION LAYER WITH MULTIPLE ASSOCIATIVE SECTORS

CROSS-REFERENCE TO RELATED APPLICATION(S)

This application claims the benefits of and priority to U.S. Provisional Patent Application Ser. No. 62/297,011 filed Feb. 18, 2016, the disclosure of which is incorporated herein by reference in its entirety.

TECHNICAL FIELD

The present disclosure relates generally to memory systems for computers and, more particularly, to a memory device having a translation layer including a stream detector.

BACKGROUND

The flash translation layer (FTL) is a software or firmware layer implemented in a flash-based solid-state drive (SSD) device that enables a flash memory to emulate certain aspects of a hard disk drive. The FTL maintains a mapping table in a memory (e.g., SRAM) of the SSD device that maps a logical page address (LPA) of an input/output (I/O) request received from a host computer to a physical page address (PPA) of the SSD device. The FTL can evenly distribute erasure requests to multiple flash blocks by wear leveling and garbage collection to improve the performance and lengthen the lifetime of the SSD.

I/O traffic from a host computer to an SSD device can be categorized as either random or sequential. Most workloads have a combination of random and sequential streams depending on a time window that an observation is made on. Workloads whose I/O operations are largely sequential and access blocks have high spatial locality are classified as a sequential workload or a sequential stream.

In a typical flash-based storage use case, an operating system of the host computer sends mixed random and sequential streams to a solid-state drive (SSD) device because memory transaction requests are generated from multiple tenants or multiple applications. The SSD device usually has no information about the incoming interleaved sequential and random streams. The mixed random and sequential streams may trigger many Full Merges (FMs) in a log-structure based FTL of an SSD, thereby increasing the cost of operation and write amplification.

Table 1 summarizes the symbols and abbreviations used in the present disclosure.

TABLE 1

| List of Symbols | |
|---|---|
| Abbreviations | Description |
| FM | Full Merge |
| PM | Partial Merge |
| SM | Switch Merge |
| SLB | Sequential Log Block |
| RLB | Random Log block |
| LBA | Logical Block Address |
| PBA | Physical Block Address |
| LPA | Logical Page Address |
| PPA | Physical Page Address |
| SZ | Sequential Buffer Zone |
| KZ | K-associative Sequential Buffer Zone |
| RZ | Random Buffer Zone |

TABLE 1-continued

| List of Symbols | |
|---|---|
| Abbreviations | Description |
| $N_L$ | Number of Log Blocks |
| $N_K$ | Upper Bound of K |
| $N_P$ | Number of Pages in a Block |
| L | Block "L" |
| \|L\| | Number of Valid Pages in Block "L" |
| K (L) | Associative Degree of Block "L" |
| X | An Unfixed Value |
| BA | Block-Associative |
| FA | Fully-Associative |
| KA | K-Associative |

Data updates in a flash memory may incur invalid pages in data blocks and eventually invoke a garbage collection in the FTL. The garbage collection may lead to merge operations to reclaim the invalid pages. Since the merge operations heavily affect the FTL performance, reducing the number of merge operations is one of the main design concerns for an FTL scheme.

In a log-structure-based FTL scheme, physical blocks of an SSD device are logically partitioned into two groups: data blocks and log blocks. When a write request arrives, the FTL first writes the new data to a log block and invalidates the data in the corresponding data block. Block-mapping information for data blocks and page-mapping information for log blocks are kept in the memory (e.g., RAM) of the SSD device for performance purposes. When the log blocks are full, the data in the log blocks are immediately flushed into the data blocks and erased to free up the log blocks. More specifically, the valid data in data blocks and the valid data in the corresponding log block are merged and written to a new clean data block. This process is referred to as a merge operation. Merge operations can be classified into three types: Full Merge (FM), Switch Merge (SM), and Partial Merge (PM).

A switch merge is triggered when all pages of a victim block (inside the log blocks) are sequentially updated from the first logical page (header) to the last logical page (tail). The FTL erases a data block filled with invalid pages and switches the corresponding log block into the data block. A victim block refers to a log block in a log block area of the SSD that is selected to be merged with its corresponding data block in a data block area.

To perform a switch merge operation, all pages in a victim block are required to be entirely filled and written in a sequential order as the data block (i.e., in-place written from the header to the tail of the block). When a new page comes to the same log block, the FTL triggers the log block to switch (replace) with the corresponding data block and erases the data block. Switch Merge does not involve any data copy, so the copy time for a switch merge is 0. The erase time for a switch merge is 1. Switch Merge is the cheapest merge operation among Switch Merge, Partial Merge, and Full Merge.

A partial merge is similar to a switch merge except for requiring a copy of one or more valid pages from a data block to a log block (victim block) in a log block area. After the one or more valid pages are copied to the log block, the FTL erases the data block, mark the log block as the data block, and assign a new empty block from an empty block list (EmptyBlockList) to the log block area. The FTL performs a partial merge when the log block is written from a header to a middle page in the block that is not the tail (i.e., in-place written but the block is not filled from the header to the tail of the block).

To perform a partial merge operation, a new incoming page should belong to the same log block (i.e., owner of the new incoming page) and be the header of the log block. The FTL copies all the remaining valid pages from the corresponding data block to this log block and erases the data block. The FTL does not write the new incoming header page to the log block because the programmed header page in that log block cannot be rewritten. Instead, the FTL marks this log block as the data block, similar to the switch merge, and assigns a new empty block from the EmptyBlockList to the log block area. Lastly, the FTL writes the new incoming header page to the newly assigned block. The copy time for a partial merge is determined by the difference between the number of pages in a block and the number of valid pages in the same block ($N_P-|L|$), and the erase time for a partial merge is 1, which is the same as the erase time for a switch merge. Although the block-erase time is far greater than a page-copy time, the page-copy time of a partial merge cannot be ignored since the accumulated multiple page-copy time can be significant.

A full merge requires the largest overhead among the three merge operations. The FTL allocates a clean block from the EmptyBlockList and copies all the valid pages from either the data block or the log block into the clean block. After all the valid pages are copied, the clean block becomes the data block, both the former data block and the log block are erased, and a new empty block will be assigned to the log block area from the EmptyBlockList. Therefore, a single full merge operation requires as many read and write operations as the number of valid pages in a block, plus two erase operations.

In a full merge, if a log block of the SSD is not written sequentially from the first page to the last page, the FTL copies valid pages from the log block and its corresponding data block to a newly allocated data block and erases the log block and its corresponding data blocks. The copy time for a full merge is determined by the product of the associativity of block L and the number of pages in the block, i.e., $K(L) \times N_P$, and the erase time for a full merge is determined by $K(L)+1$, where $K(L)$ is for external associated data blocks, and 1 is for the victim log block.

There exist several FTL mapping schemes. Examples of such FTL mapping schemes include, but are not limited to, Block Associative Sector Translation (BAST), Fully-Associative Sector Translation (FAST), Locality-Aware Sector Translation (LAST), and K-associative Sector Translation (KAST). Each of these FTL mapping schemes has advantages and disadvantages compared to other FTL mapping schemes.

BAST uses multiple log blocks to cache incoming write requests. Once every page in a log block is written, the log block replaces the corresponding data block. In this sense, BAST is referred to as a block associated dedicated translation. While FAST, LAST, and KAST can support all of the full merge, the partial merge, and the switch merge, BAST can support only the full merge and the switch merge. BAST may save cost for the switch merge. When intensive non-sequential overwrites for one hot block, or lots of (greater than the number of log blocks in the log block area) blocks occur during a given time window (e.g., cross-block thrashing), BAST can result in increased write operations.

FAST allocates a log block to more than one data blocks to increase the utilization of log blocks. To capture sequential writing streams from a mixed stream of requests, FAST separates the log blocks into a sequential log block (SLB) (block associative) and random log blocks (RLBs) (fully associative). The separation of the log blocks into the SLB and RLBs may help to resolve the thrashing issues. FAST optimizes the merge operations and introduces the partial merge. However, FAST cannot handle more than one sequential stream of requests. In addition, the way FAST determines sequentiality is whether or not a page is a header of a block; (although it is a necessary condition for SM or PM), it cannot cover all sequential cases. It is noted that "whether the workload is sequential or not" and "whether the write stream is starting from a block header" are two different conditions. FAST simply uses the former condition to determine the latter condition. Finally, in terms of cost evaluation, in FAST, full merges need to search for more than one data blocks, slowing down the merge operation.

LAST employs an access detector to detect whether a request is sequential or random, based on the write request size (e.g., threshold=4 KB). Multiple SLBs and RLBs are good for multiple streams. LAST can trigger a switch merge for a log block. A large write has a relatively high sequential locality (but not always). LAST also separates random log blocks into hot and cold regions to reduce the cost of a full merge However, LAST that dynamically changes request streams may impose severe restrictions on the utility of this scheme to efficiently adapt to various workload patterns.

KAST controls the maximum log block associativity to control the worst-case blocking time and increase the performance. In KAST, write requests are distributed among different log blocks, including multiple sequential log blocks. KAST automatically partitions between sequential and random log blocks. However, KAST requires the user to configure the K-associativity, which makes the scheme less stable and reliable.

Table 2 shows the comparison of block numbers of different associative degrees (e.g., block-associative BA, fully-associative FA, and K-associative KA) and types of merges supported by the FTL mapping schemes. These FTL mapping schemes use one or two associativities as indicated in Table 2. For example, BAST uses only block-associative, FAST and LAST use only block-associative and fully-associative, and KAST uses only fully-associative and K-associative. Table 2 also shows the number of different associative blocks in different FTL schemes.

TABLE 2

Comparison of FTL schemes

| FTL Schemes | Block Number of Different Associative | | | Merges |
|---|---|---|---|---|
| | BA | FA | KA | |
| BAST | $N_L$ | 0 | 0 | FM, SM |
| FAST | 1 | $N_L - 1$ | 0 | FM, PM, SM |
| LAST | X | $N_L - 1$ | 0 | FM, PM, SM |
| KAST | 0 | X | $N_L - X$ | FM, PM, SM |

SUMMARY

According to one embodiment, a method includes: receiving write request streams from a host computer, wherein each write stream includes one or more write requests to write data to log blocks of a nonvolatile memory and the one or more write requests are addressed in a logical page address (LPA); dividing log blocks of the nonvolatile memory into a sequential zone, a K-associative zone, and a random zone; detecting characteristics of the each write request stream and determining whether the each write request stream is either a sequential write stream that is addressed to a page of a log block in a sequential order or a random write stream that is addressed to a page of a log block in a random order; and selectively storing the each write request stream into one of the sequential zone, the K-associative zone, and the random zone of the log blocks of the nonvolatile memory based on the characteristics of the each write request stream. A first group of the write request streams that are sequential and start from a header page of a log block are stored in the sequential zone. A second group of the write request streams that are sequential but do not start from a header page of a log block are stored in the K-associative zone. A third group of the write request streams that are random are stored in the random zone.

According to another embodiment, a memory device includes: memory translation layer; a non-volatile memory including log blocks and data blocks, wherein the log blocks are divided into a first zone, a second zone, and a third zone, and a stream detector. The stream detector is configured to: receive write request streams from a host computer, wherein each write stream includes one or more write requests to write data to log blocks of a nonvolatile memory and the one or more write requests are addressed in a logical page address (LPA); detect characteristics of the each write request stream and determining whether the each write request stream is either a sequential write stream that is addressed to a page of a log block in a sequential order or a random write stream that is addressed to a page of a log block in a random order; and selectively store the each write request stream into one of the first zone, the second zone, and the third zone of the log blocks based on the characteristics of the each write request stream. A first group of the write request streams that are sequential and start from a header page of a log block are stored in the first zone. A second group of the write request streams that are sequential but do not start from a header page of a log block are stored in the second zone. A third group of the write request streams that are random are stored in the third zone.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a memory translation layer including a stream detector. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a flash translation layer (FTL). The present FTL can be considered as a stream filter-assisted, log buffer-based multiple-associative sector translation (SLMAST) FTL. The present FTL divides the SSD into a data block area and a log block area. The log block area refers to a virtual group of blocks in the SSD used as a log cache. The log block area can be further divided into three zones (or sectors) to isolate sequential and random write streams from mixed write streams including both random and sequential write streams. Random and sequential write streams are classified based on their temporal and spatial localities. A sequential write stream refers to a group of workloads addressed to pages or block in the SSD in a sequential order. Conversely, a random write stream refers to a group of workloads addressed to pages or block in the SSD in a random order. Moreover, the present FTL employs a new stream detector that can capture sequential streams from mixed write streams. By separating sequential and random streams, the present FTL can perform switch merges and partial merges as much as possible instead of costly full merges.

The present FTL defines an associative degree K(L) (associative of block L) as a number of associated blocks in the data blocks that the pages in block L belong to. Lower associative degree K(L) indicates the better performance because the amount of full merges can be reduced. The present FTL can separate sequential and random streams, and perform switch merges and partial merges as much as possible instead of costly full merges. To achieve that, the present FTL first divides the log block of the SSD into three zones to isolate random and sequential writes.

Figure 1:
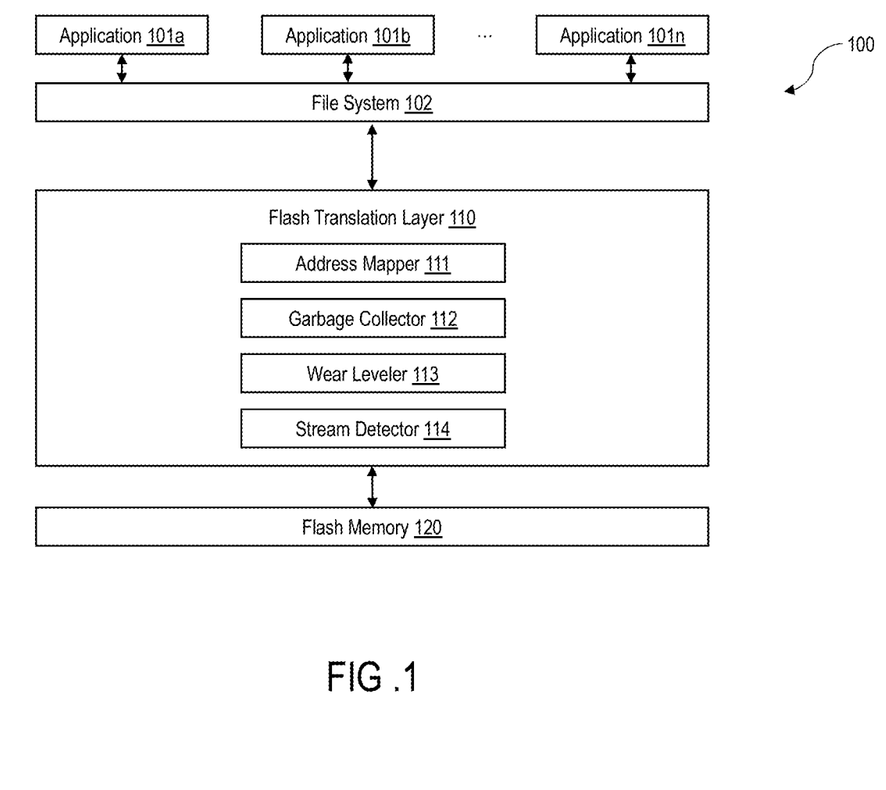
FIG. 1 shows an architecture of an example flash memory system, according to one embodiment.

FIG. 1 shows an architecture of an example flash memory system, according to one embodiment. The flash memory system 100 includes a file system 102, a flash translation layer 110, and a flash memory 120. The file system 102 of the flash memory system 100 can receive various requests from applications 101a-101n running on a host computer (not shown). The file system 102 can send the requests to the flash translation layer 110 for performing various tasks including some tasks that are specific to the flash memory 120.

The flash translation layer 110 can include an address mapper 111, a garbage collector 112, a wear leveler 113, and a stream detector 114. The address mapper 111 is in charge of address translation and block assignment. The flash translation layer 110 emulates in-place updates for a data page in a logical page address (LPA) by first acquiring a clean page and updating the corresponding data on that page, and mapping the LPA into a new physical page address (PPA). The mapping between the LPA and PPA can be maintained at a page level, a block level, or a combination of both (hybrid scheme). The stream detector 114 can detect whether the page is from a sequential stream or not.

The garbage collector 112 can erase garbage blocks with invalid and/or stale data of the flash memory 120 for conversion into a writable state. The wear leveler 113 can arrange data stored in the flash memory so that erasures and re-writes are distributed across the storage medium of the flash memory 120 to prolong a service life of the flash memory 120. In this way, no single erase block prematurely fails due to a high concentration of write cycles. There are various wear leveling mechanisms used in flash memory systems, each with varying levels of flash memory longevity enhancement.

Figure 2:
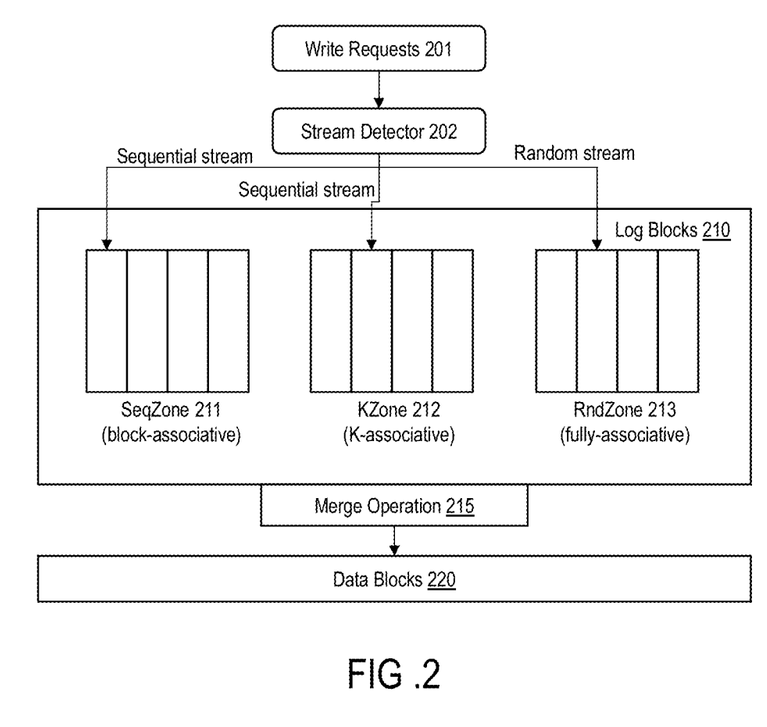
FIG. 2 shows an architecture of an example FTL, according to one embodiment.

FIG. 2 shows an architecture of an example FTL, according to one embodiment. A stream detector 202 qualifies each write request 201 (in LPA) and can send the write requests 201 to one of three zones of the log blocks 210 including a sequential zone (SeqZone) 211, a K-associative zone (KZone) 212, and a random zone (RndZone) 213. Specifically, sequential streams are in-part classified based on their starting point in the streams; the sequential streams starting from the header are sent to the SeqZone 211, and other sequential streams not starting from the header are sent to the KZone 212. Random streams are sent to the RndZone 213. The FTL can perform one or more merge operations 215 (e.g., switch merge, partial merge, and full merge) using the streamed data contained in the SeqZone 211, the KZone 212, and the RndZone 213. The data merged are stored in the data blocks 220.

Figure 3:
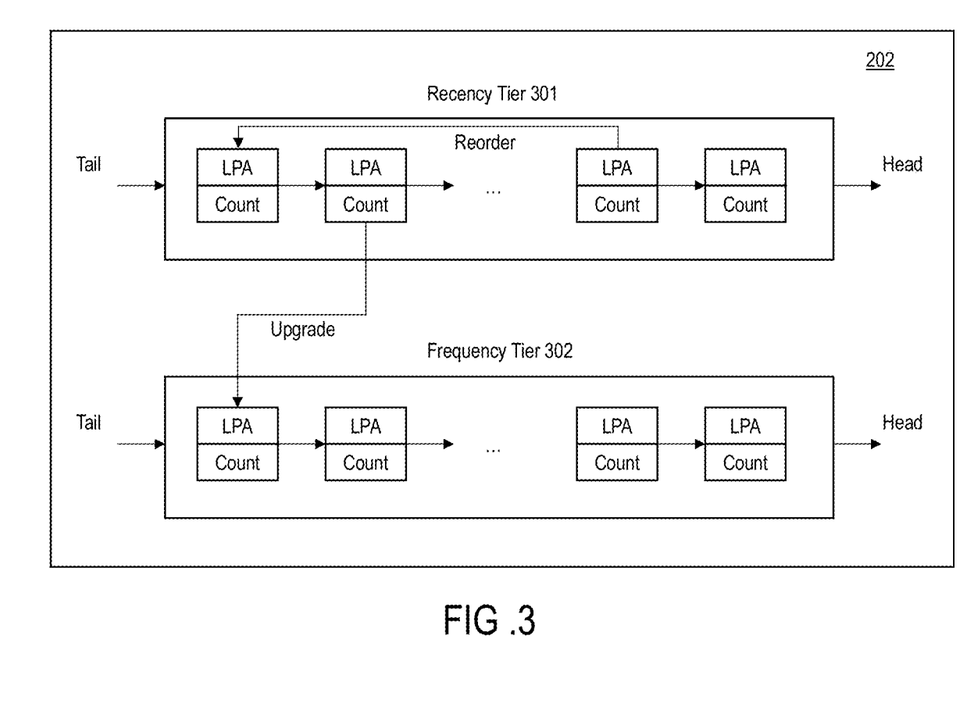
FIG. 3 shows a data structure of an example stream detector, according to one embodiment.

FIG. 3 shows a data structure of an example stream detector, according to one embodiment. The stream detector 220 can be stored in the memory (e.g., SRAM) of an SSD. In one embodiment, the stream detector 220 can have two tiers including a Recency Tier (RT) 301 and a Frequency Tier (FT) 302. Each of the RT 301 and the FT 302 can store a linked list of nodes. Each node of the linked list in the RT 301 and the FT 302 can contain an LPA and a count.

Algorithm 1 is pseudocode of an example procedure to update a record of the stream detector 220. This pseudocode is not intended to be compiled, or even to represent any particular programming language. Instead, it is simply intended to illustrate and describe the workings of the algorithm, which may be implemented in any of a variety of programming languages.

The stream detector 202 stores recent records of writes request streams in the RT 301. An input is the LPA of a new incoming page's metadata, and the stream detector investigates the I/O localities without caring about the page content value. When the stream detector 220 receives a new page in a write request, the stream detector 220 looks up queues of the previous (or several previous within a certain distance) LPA(s) in the RT 301 and the FT 302. If a node that matches with the new page is found in a queue either in the RT 301 or in the FT 302, the stream detector 220 places the node in the head of the queue. This process is referred to as "reordering". The LPA of that node is then updated with the LPA of new page, and the counter of the node is incremented by one. If no match is found, the stream detector 220 can insert a new node to the RT 301. The LPA of the new node is set as the page's LPA, and the count of the new node is set as one (indicating a new node).

Once the counter of a node reaches a certain preset threshold, the stream detector 220 can update the node to the next queue. For example, the node can be removed from the current queue and added to the head of the next queue, as shown in line 15 of Algorithm 1. This process is referred to as "upgrading." The threshold of a node upgrade is configurable and can dynamically change. The larger the threshold is, the harder the qualifying condition of an upgrade for a node. Only pages from the associated blocks in the FT 302 are considered as a part of a sequential stream. To distinguish the new incoming page's LPA and the LPA in each node, "NodeName.addr" is used to represent the LPA of that node (e.g., Algorithm 1. line 4).

```
Algorithm 1: updateStreamRecord (LPA):

1   P_RT=RT.search(LPA-1)
2   P_FT=FT.search(LPA-1)
3   if P_RT!=Nil
4       P_RT.addr=LPA
5       P_RT.count++
6       moveToTail(P_RT)
7   elif P_FT!=Nil
8       P_FT.addr=LPA
9       P_FT.count++
10      moveToTail(P_FT)
11  else
12      P_N.addr=LPA
13      P_N.count=1
14      RT.addToTail(P_N.) /* add the page to RT */
15      FT.addToTail(RT.remove(checkUpgrade(RT)) /* upgrade one
        qualified node to FT if have */
16      if len(RT)> L_RT
17          RT.evictHead( )
18      if len(FT)> L_FT
19          FT.evictHead( )
20      end if
21  end if
```

Def: RT = Recency Tier, FT = Frequency Tier, $L_{RT}$ = RT's max size, $L_{FT}$ = FT's max size.

Algorithm 2 is pseudocode of an example procedure to detect sequential streams. This pseudocode is not intended to be compiled, or even to represent any particular programming language. Instead, it is simply intended to illustrate and describe the workings of the algorithm, which may be implemented in any of a variety of programming languages. For an input of a new page's LPA), seqStreamDetect( ) checks whether the LPA is in all the associated data blocks of recorded streams in the FT 302, as shown in line of Algorithm 2. If yes, seqStreamDetect( ) can return true, else return false.

```
Algorithm 2: seqStreamDetect (LPA):

1   for each node in the FT
2       if node.addr − count + 1 ≤ LPA ≤ node.addr
3           return True
4       else
5           return False
6       end if
7   end for
```

According to one embodiment, the stream detector 220 can perform log block area partitioning. As discussed with reference to FIG. 2, the log blocks are partitioned into three zones: SeqZone (block associative) 211, KZone (K-associative) 212 and the RndZone (fully associative) 213. The associativity degree K(L) of the SeqZone 211 and the KZone 212 are 1 and $N_K$, respectively. The associativity degree K(L) of the RndZone 213 is any number between 1 and $N_D$. The SeqZone 211 can handle in-place writes whereas the KZone 212 and RndZone 213 can handle out-of-place writes. The SeqZone 211 is aimed to perform switch merge and partial merge, and the RndZone 213 is aimed to perform full merge. The KZone 212, however, is aimed to perform low-cost full merge as will be explained in further detail below. Table 3 shows the characteristics of these zones, where "[1, $N_D$]" means $1 \leq K(L) \leq N_D$.

TABLE 3

| | Zone configuration | | | | |
|---|---|---|---|---|---|
| Zone | Associative Type | Associativity Degree K (L) | Purpose | Write | Aimed Merge |
| SeqZone | Block-associative | 1 | Sequential (start from header) I/Os | in-place | SM or PM |
| KZone | K-associative | $N_K$ | Sequential (not start from header) I/Os | out-of-place | Low (controllable) cost FM |
| RndZone | Fully-associative | [1, $N_D$] | Random I/Os | out-of-place | FM |

The present flash translation layer 110 has multiple sequential log blocks that can capture multiple sequential streams at the same time without thrashing each other and triggering many full merges. A page that is a header of a block can be inserted into a block in the SeqZone 211. A Block-associative in-place write policy is enforced in the SeqZone 211 to be able to perform more switch merges and partial merges instead of full merges.

The KZone 212 is assigned to capture as many sequential streams as possible. However, not all sequential streams start from the first page of each LBA, therefore the present flash translation layer 110 cannot simply perform in-place-writes for these non-header pages due to physical limitations: within a block, the pages must be programmed consecutively from the least significant bit (LSB) page of the block to the most significant bit (MSB) pages of the block, and random page address programming is prohibited. Therefore, to save those sequential streams that do not starting from the header, the present flash translation layer 110 conducts out-of-place writes in the KZone 212. In some cases, full merges cannot be changed to switch merges or partial merges. Even in these cases, the present flash translation layer 110 can still reduce the associative degree, thereby reducing the cost and the write amplification factor. The associativity degree in the KZone 212 will be higher than SeqZone 211 but less than the fully associative RndZone 213. In some embodiments, the present translation layer 110 can impose the limitation on the maximum associativity. In the KZone 212, the present flash translation layer 110 can conduct lower cost full merges.

After header qualifying and stream detector qualifying for sequentiality, all other remaining new pages are buffered in the RndZone 213. The associative degree K(L) of the fully associative blocks in the RndZone 213 can be from 1 and $N_D$. Out-of-place writes are buffered in the RndZone 213 for random accesses to prevent them from polluting sequential streams.

According to one embodiment, the present flash translation layer 110 can impose replacement policies by handling write operations issued from the operating system of a host computer (not shown). The main procedure of an example replacement policy is explained with reference to the pseudocode Algorithm 3. This pseudocode is not intended to be compiled, or even to represent any particular programming language. Instead, it is simply intended to illustrate and describe the workings of the algorithm, which may be implemented in any of a variety of programming languages. When a collision occurs in a specific data block, the writeToLogBlk( ) (line 4 and 5 of Algorithm 3) routine is called to cache a new page into the log block, otherwise the new page is written to the data block. After writing the new page into either the log block or the data block, the present flash translation layer 110 can update the stream records based on the sequential detection results that the stream detector 202 can provide.

```
Algorithm 3: write(LPA, data):
1    LBA=LPA/N_P
2    offset=LPA mod N_P
3    PBA=getPBA(LBA)
4    if a collision occurs at offset of the dataBlk of PBA
5        writeToLogBlk(LPA, LBA, offset, data)
6    else
7        write data at offset in dataBlk of PBA
8    updateStreamRecord(LPA)
9    end if
```

Due to the physical limitation of the SSD that the flash memory 120 must be programmed to a sequential (incremental) page addressing within a block, a page needs to be a header to collect an entire (or partial) block to be able to perform either a switch merge or a partial merge. The stream detector 202 checks whether the page is a header of a block (line 2 of pseudocode Algorithm 4. Again, the pseudocode Algorithm 4 is not intended to be compiled, or even to represent any particular programming language. Instead, it is simply intended to illustrate and describe the workings of the algorithm, which may be implemented in any of a variety of programming languages.

If the page is a header (Case 1), the present flash translation layer 110 can treat a header page as a highly potential sequential stream starter and insert it to the SeqZone 211. Case 1.1 is when a page's owner block is found in the SeqZone 211; the present flash translation layer 110 needs to do a switch merge if that block is full or a partial merge if that block is not full. Then, the present flash translation layer 110 can insert the new page to a new free block. Case 1.2 (line 12 of Algorithm 4) is when the page's owner block is not in SeqZone 211; the present flash translation layer 110 can insert that page to a free block in SeqZone 211. If there is no free blocks in the SeqZone, the present flash translation layer can conduct a switch merge or partial merge on a victim block in advance. The victim block can be selected by a buffer (e.g., a FIFO buffer), and a more sophisticated selecting algorithm can be adopted based on associative degree to optimize this process.

If the page is not a header (Case 2), the present flash translation layer 110 can add the page to either the KZone 212 or the RndZone 213 or the SeqZone 211. Case 2.1 corresponds to the case when the page's owner is found in the SeqZone 211, and the page is added to the SeqZone 211. If the page is continuous to the last page in the found block and that block is not full, the present flash translation layer 110 can just append to that block (line 29 of Algorithm 4), which is a good sequential write case. If the block is full, the present flash translation layer 110 can full merge the block with a new page (line 30 of Algorithm 4).

Case 2.2 corresponds to a case where, if the page's owner is found in the KZone 212, then the page is added to the KZone 212. If that block is not full, the present flash translation layer 110 can simply append the new page to that block, otherwise the present flash translation layer 110 needs to do a full merge to that block together with a new page.

Case 2.3 corresponds to the case where that page's owner is not in the SeqZone 211 and the KZone 213. The stream detector 202 can determine whether a page is a part of a sequential stream or not. If the page is a part of a sequential stream (Case 2.3.1), the present flash translation layer 110 can add the page to the KZone 212 since the KZone 212 is intended to collect sequential streams that are not starting from the header. Although the present flash translation layer 110 might not have a switch or partial merge in the KZone 212 due to out-of-page writes and K-associativity, the present flash translation layer 110 can still reduce full merge costs when separating these sequential streams from random accesses. If the KZone 212 is full, the present flash translation layer 110 can full merge a victim block (by a FIFO buffer or other buffer management schema selection order) and then add that page to a new free block in the KZone 212. If the KZone 212 is not full, the present flash translation layer 110 can append the page to a block that has the lowest associative degree. If the page is not determined to be a part of a sequential stream, the present flash translation layer 110 can add the page to the RndZone 213 as shown in Case 2.3.2. If the RndZone 213 is full, the present flash translation layer 110 can evict a victim block (by a FIFO buffer or other buffer management schema selection order), and insert the page to a new free block. Otherwise, the present flash translation layer 110 can append the page to the RndZone 213.

It is noted that for the full merge operation in the SeqZone 211, the KZone 212, and the RndZone 213, the present flash translation layer 110 can ignore the invalid pages and consider only valid pages. The present flash translation layer 110 always knows the newest version of each page in the buffer. Invalid pages are generated when a new page with the same LPA arrives, and the present flash translation layer 110 can simply mark all existing same pages as invalid. It is further noted that the present flash translation layer 110 takes into consideration the invalid pages in the SeqZone 211 when doing switch merge and partial merge because newer version of pages exist only in the blocks of the SeqZone 211.

```
Algorithm 4: writeToLogBlk(LPA, LBA, offset, data):
1    /* Case 1. Page is header */
2    if offset==0
3        Bs=searchSameLBABlkInSZ( )
4        /* Case 1.1. Page's block is found in SeqZone, then
         switchMerge or fullMerge with a new page */
5        if Bs!=Nil
6            if Bs is full
7                switchMerge(Bs)
8                SeqZone.add(getAFreeBlk( ).add(LPA, data))
9            elif Bs is not full
10               fullMerge(Bs, LPA, data)
11           end if
12       /* Case 1.2. Page's block is not found in SeqZone, then
         switchMerge or partialMerge a victim block and add a new page into
         a new free block */
13       elif Bs == Nil
14           Bv=SZ.selectVictimBlkFIFO( )
15           if Bv is full
16               swtichMerge(Bv)
17           else
18               partialMerge(Bv)
19           end if
20           SeqZone.add(getAFreeBlk( ).add(LPA, data))
21       end if
22   /* Case 2. Page is not header */
23   else
```

-continued

```
Algorithm 4: writeToLogBlk(LPA, LBA, offset, data):

24      Bs=SZ.searchSameLBABlk (LPA)
25      Bk=KZ.searchSameLBABlk(LPA)
26      /* Case 2.1. Page's owner is found in SeqZone, then add the
        page to SeqZone */
27      if Bs!=Nil
28          if LPA==getLastLPA(LBA)+1
29              append (Bs, LPA, data)
30          else
31              fullMerge(Bs, LPA, data) /* merge the block with the
                new page */
32          end if
33      /* Case 2.2. Page's owner is found in KZone, then add the
        page to KZone */
34      elif Bk != Nil
35          if Bk is not full
36              append (Bk, LPA, data)
37          else /* the block is full */
38              fullMerge(Bk, LPA, data) /* merge the block with the
                new page */
39          end if
40      /* Case 2.3. Page's owner is not in SeqZone and KZone */
41      else
42          /* Case 2.3.1. Page is detected as part of a sequential
        stream, add to KZone */
43          if FT.seqStreamDetect(LPA)==True
44              if KZ is full
45                  fullMerge(KZ.selectVictimBlkFIFO( ))
46              end if
47              append (KZ.findBlkWithLowestK( ), LPA, data)
48          /* Case 2.3.2. Page is not detected as part of a sequential
        stream, then add to RndZone */
49          else
50              if RZ is full
51                  Bv=RZ.selectVictimBlkFIFO( )
52                  fullMerge(Bv, LPA, data)
53                  RZ.addBlkToTail(getAFreeBlk( ))
54              end if
55              RZ.append(LPA, data)
56          end if
57      end if
58  end if
```

Figure 4:
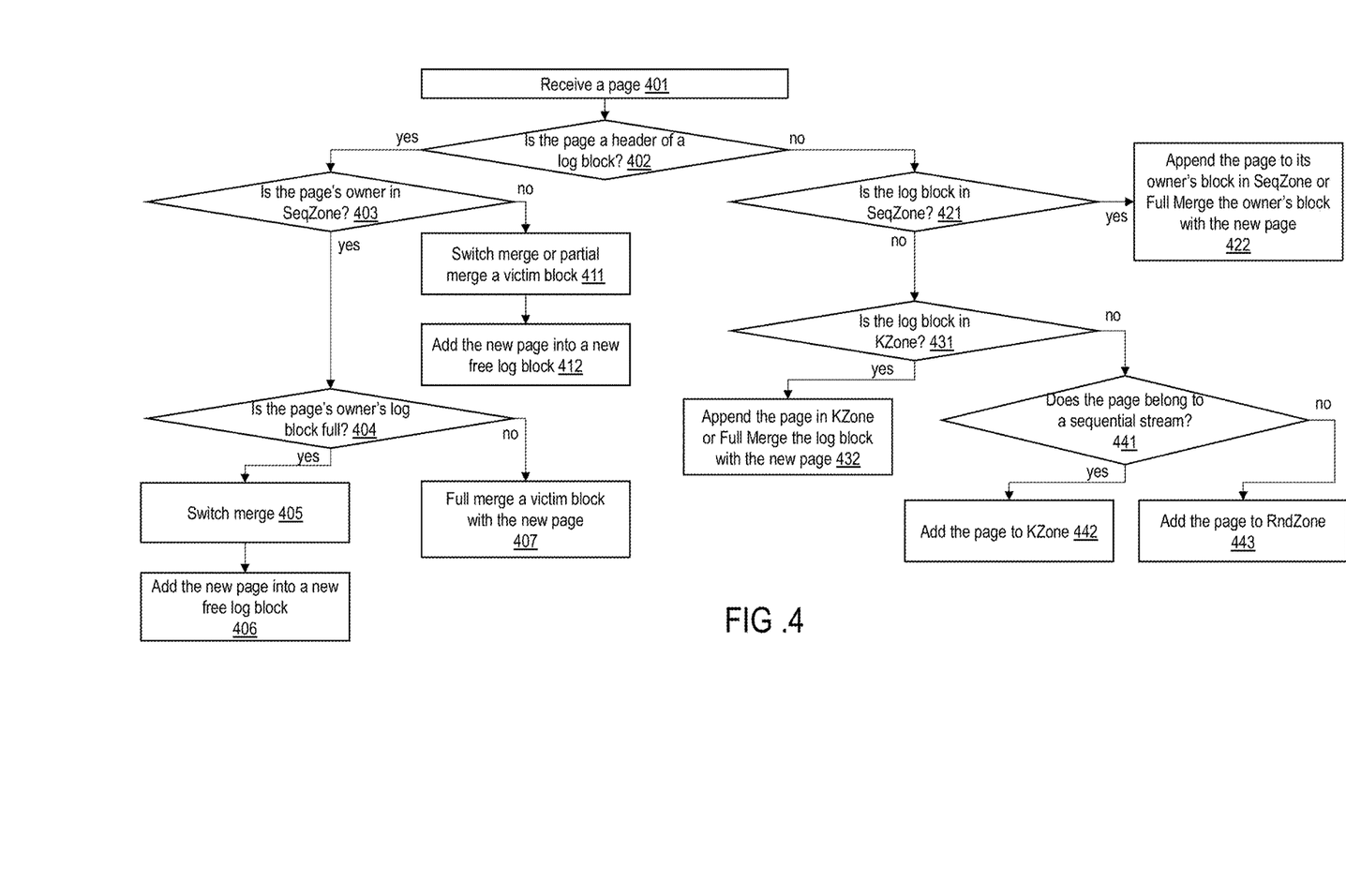
FIG. 4 is an example flowchart for classifying a new page into one of the three zones, according to one embodiment.

FIG. 4 is an example flowchart for classifying a new page into one of the three zones, according to one embodiment. The stream detector 202 receives a write request in an LPA addressed to a page of a log block (step 401). Depending on the qualification of the write request, the stream detector 202 can direct the write request to one of the SeqZone 211, the KZone 212, and the RndZone 213. First, the stream detector 202 checks if the page is a header of a log block (step 402). If the page is a header of a log block, the stream detector 202 further checks if the log block (i.e., the page's log block or the page's owner) is in the SeqZone 211 (step 403). If the log block is found in the SeqZone 211, the stream detector 202 further checks if the log block is full or not (step 404). If the log block is full, the stream detector can perform a switch merge (step 405) and add the new page into a new log free block (step 406). If the log block is not full (step 404), the stream detector can perform a full merge by merging a victim block with the new page (step 407).

If the log block that the page belongs to (i.e., page's owner) is not found in the SeqZone 211 (step 403), the stream detector 202 can perform a switch merge if the victim block is full, otherwise perform a partial merge (step 411). The FTL can add the new page into a new free block (step 412).

If the page is not a header of a block (step 402), the stream detector 202 further checks if the log block that the page belongs to (i.e., page's owner) is found in the SeqZone 211 (step 421). If the log block is found in the SeqZone 211, the stream detector 202 can append the page to the log block if the log block is not full, otherwise perform a full merge operation by merging the log block with the new page (step 422). If the page's owner is not found in the SeqZone 211 (step 421), the stream detector 202 further checks if the page's owner is found in the KZone 212 (step 431). If the page's owner is found in the KZone 212 (step 431), the stream detector 202 can append the page to the page's owner in the KZone 212 if the page's owner is not full, otherwise perform a full merge by merging the page's owner with the new page (step 432).

If the page's owner is not found in either the SeqZone 211 or the KZone 212 (steps 421 and 431), the stream detector 202 further checks if the page belongs to a sequential stream (step 441). If the page belongs to a sequential stream, i.e., the page's owner is neither in the SeqZone 211 or the KZone 212, but the page is determined to be sequential (step 441) but the page does not start from a header of a log block (step 402), the stream detector 202 can add the page to the KZone 212 (step 442), otherwise the FTL can add the page to the RndZone 213 (step 443).

According to one embodiment, a method includes: receiving write request streams from a host computer, wherein each write stream includes one or more write requests to write data to log blocks of a nonvolatile memory and the one or more write requests are addressed in a logical page address (LPA); dividing log blocks of the nonvolatile memory into a sequential zone, a K-associative zone, and a random zone; detecting characteristics of the each write request stream and determining whether the each write request stream is either a sequential write stream that is addressed to a page of a log block in a sequential order or a random write stream that is addressed to a page of a log block in a random order; and selectively storing the each write request stream into one of the sequential zone, the K-associative zone, and the random zone of the log blocks of the nonvolatile memory based on the characteristics of the each write request stream. A first group of the write request streams that are sequential and start from a header page of a log block are stored in the sequential zone. A second group of the write request streams that are sequential but do not start from a header page of a log block are stored in the K-associative zone. A third group of the write request streams that are random are stored in the random zone.

The method may further include: performing a switch merge operation using the first group of the write request stream stored in the sequential zone; performing a partial merge operation using the second group of the write request streams stored in the K-associative zone; and performing a full merge operation using the third group of the write request streams stored in the random zone.

The method may further include: determining that a page of a write request is a header of a log block and the log block stored in the sequential zone; and performing a switch merge operation if the log block is full, otherwise identifying a victim block in the sequential zone and performing a full merge operation by merging the victim block with the page.

The method may further include: determining that a page of a write request is a header of a log block and the log block is not stored in the sequential zone; identifying a victim block in the sequential zone; performing a switch merge operation if the victim block is full, otherwise performing a partial merge operation on the victim block; and adding the page into a new free block.

The method may further include: determining that a page is not a header of a log block and the log block is stored in the sequential zone; and appending the page to the log block in the sequential zone if the log block is not full, otherwise performing a full merge operation by merging the log block with the page.

The method may further include: determining that the log block is stored in the K-associative zone; and appending the page to the log block in the K-associative zone if the log block is not full, otherwise performing a full merge operation by merging the log block with the page.

The method may further include: determining that a log block that a page belongs to in a write request is not stored in either the sequential zone or the K-associative zone; determining that the page belongs to a sequential stream; and adding the page to the K-associative zone.

The method may further include: determining that a log block that a page belongs to in a write request is not stored in either the sequential zone or the K-associative zone; determining that the page does not belong to a sequential stream; and adding the page to the random zone.

The method may further include: storing a node that corresponds to a page of a write request in a linked list, wherein the node includes a logical page address and a counter. The node is stored in a recency tier if the counter of the node is lower than a threshold, and the node is stored in a frequency tier if the counter of the node is higher than the threshold.

The method may further include: receiving a new write request addressed to a new page; determining that a logical page address of the new page matches with an existing node; and reordering the existing node to a header of the queue.

According to another embodiment, a memory device includes: memory translation layer; a non-volatile memory including log blocks and data blocks, wherein the log blocks are divided into a first zone, a second zone, and a third zone, and a stream detector. The stream detector is configured to: receive write request streams from a host computer, wherein each write stream includes one or more write requests to write data to log blocks of a nonvolatile memory and the one or more write requests are addressed in a logical page address (LPA); detect characteristics of the each write request stream and determining whether the each write request stream is either a sequential write stream that is addressed to a page of a log block in a sequential order or a random write stream that is addressed to a page of a log block in a random order; and selectively store the each write request stream into one of the first zone, the second zone, and the third zone of the log blocks based on the characteristics of the each write request stream. A first group of the write request streams that are sequential and start from a header page of a log block are stored in the first zone. A second group of the write request streams that are sequential but do not start from a header page of a log block are stored in the second zone. A third group of the write request streams that are random are stored in the third zone.

The first zone may be a sequential zone, the second zone may be a K-associative zone, and the third zone may be a random zone.

The flash translation layer may be configured to: perform a switch merge operation using the first group of the write request stream stored in the sequential zone; perform a partial merge operation using the second group of the write request streams stored in the K-associative zone; and perform a full merge operation using the third group of the write request streams stored in the random zone.

The stream detector may be further configured to: determine that a page of a write request is a header of a log block and the log block is stored in the sequential zone; and perform a switch merge operation if the log block is full, otherwise identify a victim block in the sequential zone and perform a full merge operation by merging the victim block with the page.

The stream detector may be further configured to: determine that a page of a write request is a header of a log block and the log block is not stored in the sequential zone; identify a victim block in the sequential zone; perform a switch merge operation if the victim block is full, otherwise perform a partial merge operation on the victim block; and add the page into a new free block.

The stream detector may be further configured to: determine that a page is not a header of a log block and the log block is stored in the sequential zone; and append the page to the log block in the sequential zone if the log block is not full, otherwise performing a full merge operation by merging the log block with the page.

The stream detector may be further configured to: determine that the log block is stored in the K-associative zone; and append the page to the log block in the K-associative zone if the log block is not full, otherwise perform a full merge operation by merging the log block with the page.

The stream detector may be is configured to: determine that a log block that a page belongs to in a write request is not stored in either the sequential zone or the K-associative zone; determine that the page belongs to a sequential stream; and add the page to the K-associative zone.

The stream detector may be further configured to: determine that a log block that a page belongs to in a write request is not stored in either the sequential zone or the K-associative zone; determine that the page does not belong to a sequential stream; and add the page to the random zone.

The above example embodiments have been described hereinabove to illustrate various embodiments of implementing a system and method for interfacing co-processors and input/output devices via a main memory system. Various modifications and departures from the disclosed example embodiments will occur to those having ordinary skill in the art. The subject matter that is intended to be within the scope of the invention is set forth in the following claims.

What is claimed is:
1. A method comprising:
receiving write request streams from a host computer, wherein each write stream includes one or more write requests to write data to log blocks of a nonvolatile memory and the one or more write requests are addressed in a logical page address (LPA);
dividing said log blocks of the nonvolatile memory into a sequential zone, a K-associative zone, and a random zone;
detecting characteristics of the each write request stream and determining whether the each write request stream is either a sequential write stream that is addressed to a first page of a log block in a sequential order or a random write stream that is addressed to a second page of said log block in a random order; and
selectively storing the each write request stream into one of the sequential zone, the K-associative zone, and the random zone of the log blocks of the nonvolatile memory based on the characteristics of the each write request stream,
wherein a first group of the write request streams that are sequential and start from a header page of said log block are stored in the sequential zone,
wherein a second group of the write request streams that are sequential but do not start from said header page of said log block are stored in the K-associative zone, and wherein a third group of the write request streams that are random are stored in the random zone.

2. The method of claim 1, further comprising:
performing a switch merge operation using the first group of the write request stream stored in the sequential zone;
performing a partial merge operation using the second group of the write request streams stored in the K-associative zone; and
performing a full merge operation using the third group of the write request streams stored in the random zone.

3. The method of claim 1, further comprising:
determining that a page of a write request is a header of a log block and the log block is stored in the sequential zone; and
performing a switch merge operation if the log block is full, otherwise identifying a victim block in the sequential zone and performing a full merge operation by merging the victim block with the page.

4. The method of claim 1, further comprising:
determining that a page of a write request is a header of a log block and the log block is not stored in the sequential zone;
identifying a victim block in the sequential zone;
performing a switch merge operation if the victim block is full, otherwise performing a partial merge operation on the victim block; and
adding the page into a new free block.

5. The method of claim 1, further comprising:
determining that a page is not a header of a log block and the log block is stored in the sequential zone; and
appending the page to the log block in the sequential zone if the log block is not full, otherwise performing a full merge operation by merging the log block with the page.

6. The method of claim 5, further comprising:
determining that the log block is stored in the K-associative zone; and
appending the page to the log block in the K-associative zone if the log block is not full, otherwise performing a full merge operation by merging the log block with the page.

7. The method of claim 1, further comprising:
determining that said log block that a page belongs to in a write request is not stored in either the sequential zone or the K-associative zone;
determining that the page belongs to a sequential stream; and
adding the page to the K-associative zone.

8. The method of claim 1, further comprising:
determining that a log block that a page belongs to in a write request is not stored in either the sequential zone or the K-associative zone;
determining that the page does not belong to a sequential stream; and
adding the page to the random zone.

9. The method of claim 1, further comprising:
storing a node that corresponds to a page of a write request in a linked list, wherein the node includes a logical page address and a counter,
wherein the node is stored in a recency tier if the counter of the node is lower than a threshold, and
wherein the node is stored in a frequency tier if the counter of the node is higher than the threshold.

10. The method of claim 9, further comprising:
receiving a new write request addressed to a new page;
determining that a logical page address of the new page matches with an existing node; and
reordering the existing node to a header of the queue.

11. A memory device comprising:
a memory translation layer;
a non-volatile memory comprising log blocks and data blocks, wherein the log blocks are divided into a first zone, a second zone, and a third zone; and
a stream detector configured to:
receive write request streams from a host computer, wherein each write stream includes one or more write requests to write data to said log blocks of said non-volatile memory and the one or more write requests are addressed in a logical page address (LPA);
detect characteristics of the each write request stream and determining whether the each write request stream is either a sequential write stream that is addressed to a first page of a log block in a sequential order or a random write stream that is addressed to a second page of said log block in a random order; and
selectively store the each write request stream into one of the first zone, the second zone, and the third zone of the log blocks based on the characteristics of the each write request stream,
wherein a first group of the write request streams that are sequential and start from a header page of said log block are stored in the first zone,
wherein a second group of the write request streams that are sequential but do not start from a header page of a log block are stored in the second zone, and
wherein a third group of the write request streams that are random are stored in the third zone.

12. The memory device of claim 11, wherein the first zone is a sequential zone, the second zone is a K-associative zone, and the third zone is a random zone.

13. The memory device of claim 11, wherein the flash translation layer is configured to:
perform a switch merge operation using the first group of the write request stream stored in the sequential zone;
perform a partial merge operation using the second group of the write request streams stored in the K-associative zone; and
perform a full merge operation using the third group of the write request streams stored in the random zone.

14. The memory device of claim 11, wherein the stream detector is further configured to:
determine that a page of a write request is a header of said log block and the log block is stored in the sequential zone; and
perform a switch merge operation if the log block is full, otherwise identify a victim block in the sequential zone and perform a full merge operation by merging the victim block with the page.

15. The memory device of claim 11, wherein the stream detector is further configured to:
determine that a page of a write request is a header of a log block and the log block is not stored in the sequential zone;
identify a victim block in the sequential zone;
perform a switch merge operation if the victim block is full, otherwise perform a partial merge operation on the victim block; and
add the page into a new free block.

16. The memory device of claim 11, wherein the stream detector is further configured to:
determine that a page is not a header of a log block and the log block is stored in the sequential zone; and append the page to the log block in the sequential zone if the log block is not full, otherwise performing a full merge operation by merging the log block with the page.

17. The memory device of claim 11, wherein the stream detector is further configured to:
   determine that the log block is stored in the K-associative zone; and
   append the page to the log block in the K-associative zone if the log block is not full, otherwise perform a full merge operation by merging the log block with the page.

18. The memory device of claim 11, wherein the stream detector further is configured to:
   determine that a log block that a page belongs to in a write request is not stored in either the sequential zone or the K-associative zone;
   determine that the page belongs to a sequential stream; and
   add the page to the K-associative zone.

19. The memory device of claim 11, wherein the stream detector is further configured to:
   determine that a log block that a page belongs to in a write request is not stored in either the sequential zone or the K-associative zone;
   determine that the page does not belong to a sequential stream; and
   add the page to the random zone.

* * * * *